United States Patent
Chaine et al.

(10) Patent No.: US 8,619,063 B2
(45) Date of Patent: Dec. 31, 2013

(54) METHOD FOR DETERMINING A TOUCH EVENT AND TOUCH SENSITIVE DEVICE

(75) Inventors: Sebastien Chaine, L'Hay-les-Roses (FR); Georges Farah, Versasilles (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 13/808,058

(22) PCT Filed: Jul. 8, 2011

(86) PCT No.: PCT/EP2011/003419
§ 371 (c)(1),
(2), (4) Date: Jun. 20, 2013

(87) PCT Pub. No.: WO2012/003996
PCT Pub. Date: Jan. 12, 2012

(65) Prior Publication Data
US 2013/0257821 A1    Oct. 3, 2013

(30) Foreign Application Priority Data
Jul. 9, 2010 (EP) .................................... 10290381

(51) Int. Cl.
*G06F 3/043* (2006.01)
(52) U.S. Cl.
USPC ...................................... 345/177; 178/18.04
(58) Field of Classification Search
USPC .............................. 345/173–178; 178/18.01, 178/201.01–20.04; 367/118–129; 341/5; 327/551–558; 340/407.1–407.2
See application file for complete search history.

(56) References Cited

U.S. PATENT DOCUMENTS

| | | | |
|---|---|---|---|
| 2004/0133366 A1 | 7/2004 | Sullivan et al. | |
| 2005/0146512 A1 | 7/2005 | Hill et al. | |
| 2005/0174338 A1* | 8/2005 | Ing et al. | 345/177 |
| 2006/0214921 A1 | 9/2006 | Takahashi et al. | |
| 2008/0166048 A1* | 7/2008 | Raif et al. | 382/187 |
| 2008/0192027 A1 | 8/2008 | Morrison | |
| 2009/0195518 A1 | 8/2009 | Mattice et al. | |
| 2009/0273583 A1 | 11/2009 | Norhammar | |
| 2009/0322497 A1 | 12/2009 | Ku et al. | |
| 2010/0026667 A1 | 2/2010 | Bernstein | |
| 2011/0007021 A1* | 1/2011 | Bernstein et al. | 345/174 |

FOREIGN PATENT DOCUMENTS

| | | |
|---|---|---|
| EP | 0 755 020 A2 | 1/1997 |
| WO | WO 2009/093056 A1 | 7/2009 |

OTHER PUBLICATIONS

European Search Report for Application No. EP 10 29 0381 dated Feb. 11, 2011.
Communication for Application No. EP 10 290 381.2 dated Nov. 26, 2012.
International Search Report for Application No. PCT/EP2011/003419 dated Aug. 3, 2011.
Checka, N., *A System for Tracking and Characterizing Acoustic Impacts on Large Interactive Surfaces*, Massachusetts Institute of Technology, May 31, 2001, 104 pages.
Paradiso, J.A. et al., *18.3: Passive Acoustic Sensing for Tracking Knocks Atop Large Interactive Displays*, Proceedings of IEEE Sensors 2002, vol. 1, Jun. 12, 2002, pp. 521-527.

* cited by examiner

*Primary Examiner* — Liliana Cerullo
(74) *Attorney, Agent, or Firm* — Alston & Bird LLP (57) ABSTRACT

The invention relates to a method for determining a touch event provided by a user on an interaction surface of a touch sensitive device comprising the steps of: sensing a raw signal by a transducer, in particular by a piezoelectric transducer and low-pass filtering the sensed signal, segmenting the filtered raw signal into a baseline signal and at least one useful signal, and analyzing the at least one useful signal to determine properties of the touch event.

21 Claims, 4 Drawing Sheets

METHOD FOR DETERMINING A TOUCH EVENT AND TOUCH SENSITIVE DEVICE

The invention relates to a method for determining a touch event provided by a user on an interaction surface of a touch sensitive device. The invention furthermore relates to a touch sensitive device configured to carry out this method.

A plurality of different technologies exists to provide touch sensitive interfaces. One can mention technologies such as capacitive, resistive, surface acoustic wave or acoustic technologies based on bending waves. These methods have in common that touch events, such as a dragging interaction of a finger over the interaction surface and/or multi-touch touch events such as a zoom-in or zoom-out touch gesture during which two fingers move away or towards each other, are identified once the x, y coordinates of the touch points building up the touch event have been identified by the underlying analyzing method.

However, to determine the x, y coordinates of the various touch points of one touch event, the hardware and software necessary to identify these complex gestures are rather demanding leading to a complex and, therefore, more expensive functionality. Thus touch sensitive devices having this functionality are incorporated only in high end products.

Taking the acoustic technology based on bending waves created during the touch event and travelling inside the touch sensitive interaction surface towards transducers, it is for instance necessary to build up databases with reference acoustic signals to be able to identify the locations of each individual touch point building up the gesture.

To be able to introduce this kind of technology also in low cost applications or, in general, to be able to provide this functionality at lower cost, it is therefore the object of this invention to simplify the method for determining a touch event.

This object is achieved with the method for determining a touch event according to claim 1. It is the surprising finding of this invention that it is indeed possible to identify properties of a touch event based on low pass filtered sensed signals. In the abovementioned acoustic technologies, low frequencies have been rejected via high pass filtering. The reason for this rejection was the interference between the low frequencies with noise. Now, by introducing an additional step of segmenting the filtered raw signals into baseline signals representing the norm, a useful signal becomes possible to exploit low frequencies.

Here the term "touch event" relates to any interaction between a user and an interaction surface, which can be a single impact, provided by a user's finger or a stylus, a multi-touch event, e.g. by hitting the interaction surface with more than one finger at the same time, but also to dragging events during which the user moves with his finger or the stylus over the interaction surface and which again can be a single or a multi-touch event. For instance, a single dragging touch event relates to the swipe or flick gestures used in electronic devices and the multi-touch drag events relate to rotation, zoom-in and zoom-out touch events.

According to a preferred embodiment, step b can comprise applying a statistical model to segment the filtered raw signal. Statistical models have the advantage that, without knowing the exact form of an interaction, only knowing some characteristic differences between a useful signal and a baseline, it is possible to identify the one or the other class of event out of a signal that could be built up out of both classes. There is thus no need to establish a threshold value above which the signal is considered to be a useful signal and below which the signal is considered to be baseline/noise.

Preferably, the method can be carried out in the time domain. Thus no transformation into the frequency domain needs to be carried out which simplifies the hardware necessary to realize the method according to the invention.

Preferably, the filter can have a maximum passing frequency of 100 Hz, in particular 50 Hz, more in particular 30 Hz. In this frequency range, a touch event occurring in the vicinity of a transducer leads to a pattern that can be, on the one hand, exploited to identify the useful signal part of the raw signal data and, on the other hand, also to determine certain properties of the touch event.

Further preferred, step b can comprise an expectation maximization algorithm, in particular a classification expectation maximization algorithm. These statistical methods are iterative techniques capable to maximize the likelihood whenever data is incomplete and can be used in case of a mixture of data. This algorithm has the advantage that it converges. In a variant, an additional classification is introduced forcing the probabilities of classes to occur at a given time to zero or one. The classification algorithm has the advantage that it converges faster and is therefore well suited to real time processing.

Preferably, it is assumed that both baseline and useful signals each have Gaussian distributions and that their corresponding signal energies follow Gamma distributions. Gaussian and Gamma distributions have known properties which simplify the programming of the algorithm so that the hardware necessary to realize the algorithm can be kept simple and processing speed kept high.

Preferably, during the segmentation step of the expectation maximization algorithm, the variances of the two distributions are based on signal energy, wherein the useful signal class relates to maximal energy and the baseline class relates to the median energy. It appears that these initial variances form a starting condition leading to a rapid convergence of the expectation maximization algorithm.

Advantageously, during segmenting step b, a stream of a predetermined duration of the sensed signal can be analysed. Typically, a gesture on a mobile device such as zoom-in, zoom-out, rotate, swipe or flick gesture does not take more than 500 milliseconds. Therefore, it is sufficient to analyse data streams of the sensed signal having a duration of, at most, two seconds. Indeed, by providing a data stream longer than a typical gesture touch event, it is possible to always provide some baseline information, so that the CEM algorithm can converge and identify two distributions.

Preferably, as soon as an useful signal has been identified during step b, the useful signal can already be analyzed to be able to determine properties of the corresponding touch event before the complete data stream has been analzed. Thus, one does not have to await the end of the datastream before a command corresponding to a given gesture will be output. Therefore the method can be run under real time conditions.

Preferably the CEM algorithm can comprise a weighting step concerning the initial condition at least of the baseline signal to improve the estimate of the input variance. In particular, in case the CEM algorithm has not found a useful signal, the determined variance value can be used as input variance for the baseline signal in the next run. Eventually a memory effect can be added.

Preferably, subsequent data streams of the sensed signal overlap. Thus, at least partially, already treated data is re-analysed again which can be used to improve the reliability of the segmenting step of the invention.

The method can advantageously be further configured such that a useful signal is transmitted to step c only if it has been identified at least twice. This will reduce the risk that a particular noise event will cause an inappropriate output.

Further preferred, if during step b the same useful signal has been identified in a predetermined amount of streams, in particular in two or three streams, the following stream does not overlap with the part up to the end of the useful signal of the preceding stream. Thus, once the presence of a useful signal has been confirmed a predetermined amount of times, this part of the sensed signal does not need to be treated again so that calculation capacity can be saved which further helps to provide real time data analysis performance.

Preferably, an 80-95% signal overlap is performed in the method according to the invention.

According to a preferred embodiment, the step c can comprise attributing a touch event as soon as a useful signal has been transmitted to step c. Thus, in case one is only looking for determining that a touch event, such as an impact, has occurred on the interaction surface, for instance to switch on or off a certain functionality, the identification of the useful signal is sufficient.

As for this kind of interaction, a very simple touch event sensing method can be provided. According to a preferred embodiment, step a can comprise sensing raw signals by more than one, in particular four, transducers and carrying out step b for each one of the sensed signals. It was found out that, in the low frequency range analysed according to the invention, the particular patterns observed in the sensed signals upon reception of the touch event are observed in the vicinity of the transducers. Thus, by providing a plurality of transducers, it will become possible to not only identify that an impact has occurred but close to which transducer the touch event occurred and, of course, also at what time.

Further preferred, step c can comprise identifying various types of gestures, in particular drag and its direction and/or rotate and sense of rotation and/or zoom-in and/or zoom-out, based on the time delay between one or more predetermined characteristics of the useful touch signals identified during step b and/or their relative value for the more than one sensed raw signals. Preferably, the one or more predetermined characteristics relate to the position of the maximal, minimal or signal average crossing of the useful signal. Thus, without complicated calculations or without having to establish a database and, more in particular, without having to identify the precise x and y coordinates of the touch points building up a touch gesture touch event, it becomes possible by analyzing low frequency signals to identify these kind of gestures by simply looking at the moment a useful signal occurs at a given transducer and, eventually, the comparison of the absolute values of the special characteristics of the pattern.

According to a preferred embodiment, the type of gesture is only determined based on the time delay and the positions of the transducers with respect to the interaction surface. Thus, it becomes possible to provide a cheap touch sensitive device capable of identifying even complex touch event gestures.

According to an advantageous embodiment of the invention, the method can further comprise a step of smoothing the useful signal prior to step c. By applying a smoothing step, e.g. use a further low pass filter, further noise reduction can be achieved to optimize the touch event recognition.

The object of the invention is also achieved with the computer program product comprising one or more computer readable media having computer executable instructions for performing steps b) and c) of the inventive method.

The object of the invention is also achieved with a touch sensitive device according to claim 19 and which is configured to identify the touch event according to the method as described above. As a consequence, a touch sensitive device can be provided that is capable of identifying even complex gestures such as multi-touch gestures while, at the same time, the device can be kept cheap so that it can be used in low end applications. This is particularly due to the fact that no predetermined database is necessary and no complex data treatments. The interaction surface can be made out of any solid material, in particular out of glass, plastic or metal or a mixture thereof.

Furthermore, the object of the invention is achieved by a mobile device comprising a touch sensitive device as described above. In particular, for mobile devices which have a rather small form factor, all sorts of touch events can be identified by the method as described above without having to place a high number of transducers over the surface of the device. Typically, four to six transducers are sufficient to provide the desired functionality.

According to an advantageous embodiment, the mobile device can have a touch sensitive device functionality at its front and/or back side, wherein a display device is provided on the front side. Thus, it becomes possible to provide input to the mobile device by carrying out a touch event gesture either on the side of the display, but it is also possible to provide the input via a touch gesture on the opposite side which still keeping the device simple.

In the following embodiments of the invention will be described in detail in conjunction with the accompanying figures.

Figure 1:
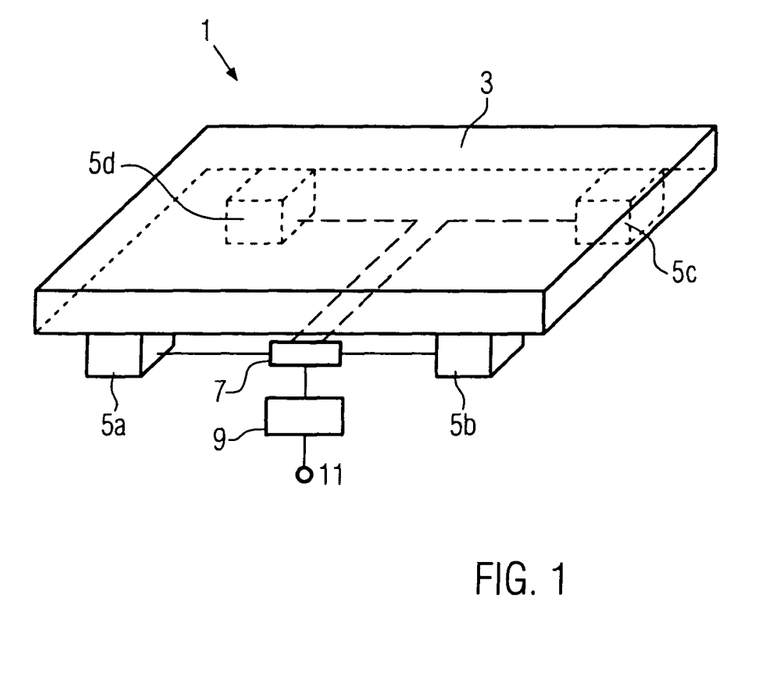
FIG. 1 illustrates a touch sensitive device according to a first embodiment of the invention.

FIG. 1 illustrates a touch sensitive device 1 according to a first embodiment of the invention. The touch sensitive device 1 comprises an interaction surface 3 and four transducers 5a-5d linked to a low pass filter unit 7 and a signal analyzing unit 9. The touch sensitive device 1 can be part of an electronic device, like any type of mobile device, like a mobile phone, a MP3 player or any device needing a user interface with or without display. The touch sensitive device 1 is configured to indentify touch events provided by a user touching the interaction surface, e.g. by touching the surface with one or more fingers, or by dragging one or more fingers over the surface of the interaction surface to identify their properties so that they can be classified as e.g. one of a drag along a certain direction, e.g. a flick or swipe gesture or a rotation together with the direction of rotation or a zoom-in or zoom-out gesture or a simple touch. The identified touch event can then be output via interface 11 to a controlling device of the electronic device.

The interaction surface 3 can be made of any solid material like glass, plastic or metal. The transducers 5a to 5d in this embodiment are piezoelectric transducers but could also be a microphone or a MEMS. They serve to transform a signal travelling on or through the interaction surface 3 into electric signals that can be analysed. The signal is the result of a touch event provided by a user. Instead of four transducers, it is of course possible to use more or less transducers depending on the applications of the touch sensing device 1 and the resolution needed. If one wants only to identify whether a touch event took place or not, it is even possible to work with only one transducer 5a. Furthermore, in this embodiment, the transducers 5a to 5d are arranged on the side of the interaction surface 3 opposite to where a user provides touch gestures.

The low pass filter unit 7 has a cut off frequency of maximal 100 Hz, but preferably a cut of frequency of 50 Hz or even better of 30 Hz and can be an analogue or digital filter. The filtered raw signal sensed by the transducers 5a to 5d will then be output to the signal analyzing unit 9.

Figure 2:
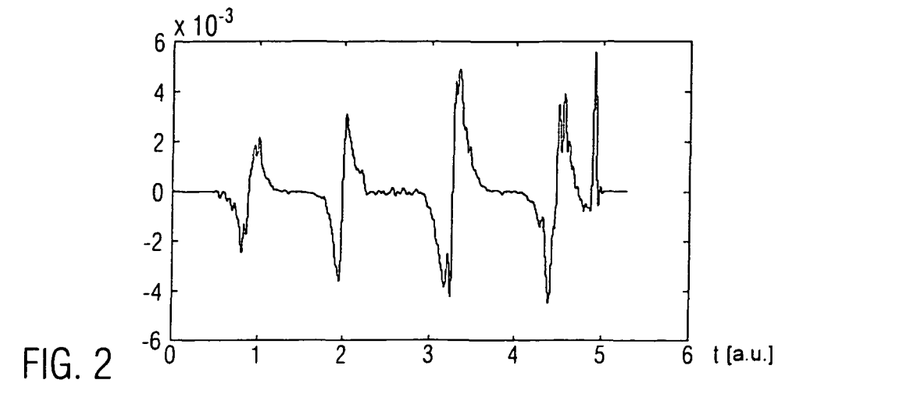
FIG. 2 illustrates a typical signal sensed by a transducer when a touch event occurs in the vicinity.

In fact, a particular pattern, as illustrated in FIG. 2, can be observed in the very low frequency range at a transducer 5a to 5d, when touch events occur near a transducer. The closer the touch event is to the transducer the stronger the pattern. FIG. 2 actually illustrates the amplitude of the signal as a function of time with a cut-off frequency of 30 Hz. In FIG. 2, five touch events can be identified.

The dependence of the signal on a transducers 5a to 5d proximity means that whenever a touch event, like a drag occurs near a given transducer, e.g. 5a, it will induce a pattern similar to the one described above, and that when this drag moves to another transducer, e.g. 5b, it will induce a similar pattern near that transducer at a later time.

Without having to analyse the exact coordinates along which the touch event occurs, it becomes thus possible to identify gestures like described above. The problem of detecting a drag location is replaced by the detection of the proximity between the dragging touch event or a touch and the transducers attached to the interaction surface 3. Hence it is possible to estimate an approximate drag location and its direction, which is sufficient for the typical applications of touch gestures used in electronic devices (switch on/off, flick, swipe, rotate, zoom), which do not need more exact location information. This is particularly true for applications with small surfaces as the number of transducers necessary to identify these types of gestures can be kept low, e.g. four like in this embodiment.

The corresponding analysis is carried out in the signal analyzing unit 9. A second embodiment of the inventive method realized by the touch sensitive device 1 to identify properties of touch events, such that their classification can be carried out, will now be described in detail using the block diagram of FIG. 3.

Figure 3:
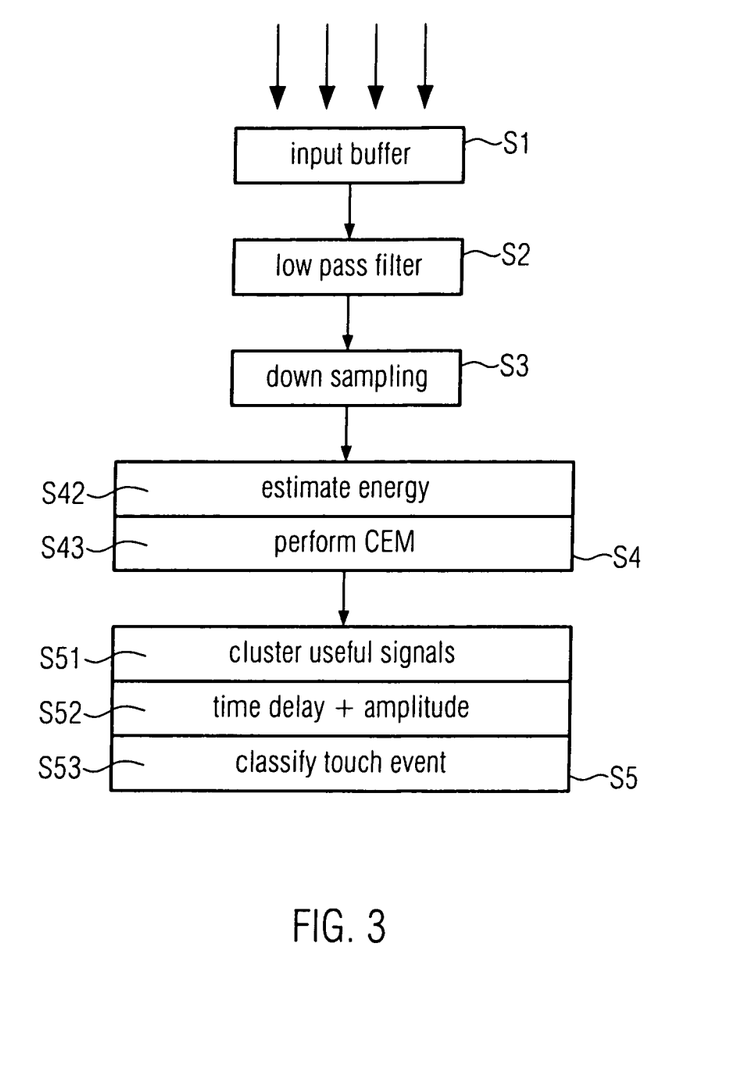
FIG. 3 illustrates a block diagram of a method according a second embodiment of the invention.

First of all the raw signals sensed by the transducers 5a to 5d are stored in an input buffer. The raw signals typically are sampled at a sampling rate of 1000 Hz (step S1). In each analyzing run a data stream of a predetermined amount of sensed data points will be analysed. In this embodiment a datastream of 2048 sensed signal points corresponding to about 2 seconds is analysed.

Then a low pass filter (filtering unit 5) is applied to the raw sensed signals of the data stream with a cutting frequency of 100 Hz, preferably 50 Hz, more preferably at 30 Hz (step S2). To reduce the data that has to be analysed an optional step S3 can be introduced which consists in downsampling the sensed raw signals, e.g. by a downsampling by a factor of 32. By doing so a data stream of about 2 seconds, representing about 2048 measurement points will be reduced to 64 measurement points. This has the advantage that the amount of data to be treated can be reduced but still the touch events provided by a user can be identified.

The next step S4 of the inventive method is the so called triggering step or segmenting step used to segment the filtered and downsampled raw signal in periods of a baseline signal corresponding to noise and periods of a useful signal corresponding to a touch event. The parts of the data stream corresponding to baseline will be rejected whereas the remaining segments carrying useful signals will be further processed by data analyzing unit 9 during step S5.

In the following the triggering step S4 will be described in more detail.

The main objective of the triggering step S4 is to segment the filtered raw signal data streams into baseline signals and useful signals. The basic hypothesis applied in this second embodiment is that the sensed signal data follows a Gaussian distribution, whatever it is a baseline or a useful signal. Note that a kurtosis-based trigger assumes that only baseline data are Gaussian. The segmentation is carried out for each one of the signals provided by each one of the transducers 5a to 5d. Thus in cases of four transducers, four data streams are analysed.

As a consequence the filtered and downsampled sensed signal output after step S3 is assumed to represent a mixture of two classes. The first class being the baseline and the second class being the useful signal, supposed to be induced by a touch event provided by a user and sensed by one or more transducers 5a to 5d. Triggering is thus equivalent to segmentation, where it is desired to detect useful signals from a mixture of a maximum of two classes of signals.

According to the invention an algorithm based on likelihood maximization, called Expectation Maximization (EM), is applied to carry out the segmentation. This is an iterative process, which consists in assigning automatically a class out of the two classes to every measurement point of the data stream currently under analysis.

The EM algorithm is usually used on mixture data. In other words, it is supposed to have a set of m classes $\{C_k, k=1 \ldots m\}$, and samples $x=\{x_1, x_2, \ldots, x_n\}$, with $x_i$ belonging to a class $C_k$. Each class $C_k$ is defined via its proper parameter vector $\Theta_k$ and its a priori probability $\pi_k$. The problem consists in estimating the parameter vector $\Theta=[\pi_1, \pi_2, \ldots \pi_m, \Theta_1, \Theta_2, \ldots \Theta_m]$ using the likelihood maximization. The general EM algorithm can be summarized as follows:

1—Provide initial parameters $\Theta$,
2—Estimate a posteriori probabilities,
3—Maximisation maximize the likelihood by assessing new parameters,
4—Go to 2 until convergence In fact, the log-likelihood that a sample $x_i$ belongs to a class $C_k$ is denoted by $\log(L(\Theta_k/x_i))=\log f(x_i/\Theta_k)$, with $f(x_i/\Theta_k)$ being the probability that the sample $x_i$ belongs to the class $C_k$. This implies that the log-likelihood of the vector $x=\{x_1, x_2, \ldots, x_n\}$ is given by $$\log(L(\Theta/x)) = \sum_{i=1}^{n} \log f(x/\Theta).$$

When dealing with a mixture of m classes, the log-likelihood may be written as $$\log(L(\Theta/x)) = \sum_{i=1}^{n} \log \left( \sum_{k=1}^{m} \pi_k f(x_i/\Theta_k) \right).$$

This form does not have any analytical solutions.

One way to solve this problem according to the invention is to introduce n missing data $z_{ik}=1$ if the sample $x_i$ is generated by the class $C_k$, and $z_{ik}=0$ else. The introduction of the vector z simplifies the expression of the log-likelihood $$\log(L(\Theta/x, z)) = \sum_{i=1}^{n} \sum_{k=1}^{m} z_{ik} \log(\pi_k f(x_i/\Theta_k)).$$

Instead of an EM algorithm, it is also possible to apply its variation, the so called Classification-EM algorithm to the datastream. This algorithm comprises in addition a classification step. The a posteriori probabilities are equal to 0 and 1, using the maximum a posteriori decision rule (MAP).

The Classification-EM has the advantage that it is faster than the EM algorithm, and is thus better adapted to real-time processing of measurement data.

The Classification-EM algorithm may be expressed in the case of a mixture as the following:

1—Initialization: $\Theta^0 = [\pi_1^0, \pi_2^0, \ldots \pi_m^0, \Theta_1^0, \Theta_2^0, \ldots \Theta_m^0]$ 2—Estimation: Assessment of the a posteriori probabilities:

$$\hat{z}_{ik}^{(t)} = \frac{\pi_k^{(t)} f(x_i; \Theta_k^{(t)})}{\sum_{l=1}^{m} \pi_l^{(t)} f(x_i; \Theta_l^{(t)})}$$

3—Classification: using the MAP decision rule $$u_{ik}^{(t)} = \begin{cases} 1 & \text{si } \hat{z}_{ik}^{(t)} = \max_l (\hat{z}_{il}^{(t)}) \\ 0 & \text{sinon} \end{cases}$$

4—Maximization:

$$\Theta^{(t+1)} = \arg\max_{\Theta} \sum_{i=1}^{n} \sum_{k=1}^{m} u_{ik}^{(t)} \log(\pi_k^{(t)} f(x_i; \Theta_k^{(t)}))$$

5—Go to 2 until convergence

According to the invention, one considers that the sensed, filtered and downsampled raw data corresponds to a mixture of two Gaussian classes. The first class concerns the baseline (when no touch event is done) and the second class denotes the useful signal (when a touch event occurs). One can furthermore make the assumption that these classes are zero-mean Gaussian distributions, see e.g. FIG. 2. This means that every sample $x_i$ belongs to either $N(0, \sigma_1^2)$ or $N(0, \sigma_2^2)$, with a being the variance of the distribution. The invention is, however, not limited to identifying two classes out of the gathered data. Eventually more than two distributions with characteristic properties in the Gamma distribution could of course also be identified. This could e.g. be of interest to identify different types of impacts on the interaction surface.

To be able to separate the two distributions one looks at the signal energy. Thus an energy transformation using n points of the datastreams is used to enable the segmentation. In addition, the assumption is taken that the samples are independent, which means that their energy follows a Gamma distribution. If independent $x_i \sim N(0, \sigma^2)$, then $$y = \sum_{i=1}^{n} x_i^2$$

follows a Gamma distribution $$f(y) = \frac{1}{(2\sigma^2)^{\frac{n}{2}} \Gamma\left(\frac{n}{2}\right)} y^{\frac{n}{2}-1} e^{-\frac{y}{2\sigma^2}}.$$

Initially, both classes are thus zero-mean Gaussian distributions with variances $\sigma_1^2$ and $\sigma_2^2$. The complete Classification-EM algorithm can then be written as follows:

1—Energy estimation on n points. The output is a mixture of N points $$y = \sum_{i=1}^{n} x_i^2$$

2—Initialization: The initial parameters vectors is $\Theta^0 = [\pi_1^0, \pi_2^0, \sigma_1^0, \sigma_2^0]$, with denoting the a priori probabilities for every distribution, and $\sigma_i$ the corresponding standard deviations at t=0. For $\{k=1, 2 \text{ and } j=1 \ldots N\}$ 3—Estimate the a posteriori probabilities $$\hat{z}_{jk}^{(t)} = \frac{\pi_k^{(t)} f(y_j / \sigma_k^{(t)})}{\sum_{l=1}^{2} \pi_l^{(t)} f(y_j / \sigma_l^{(t)})}$$

4—Classification:

$$u_{jk}^{(t)} = \begin{cases} 1 & \text{if } \hat{z}_{jk}^{(t)} = \max_l (\hat{z}_{jl}^{(t)}) \\ 0 & \text{else} \end{cases}$$

5—Update the parameters after the likelihood maximization:

$$\sigma_k^2 = \frac{\sum_j y_j u_{jk}^{(t)}}{N \sum_j u_{jk}^{(t)}} \text{ and } \pi_k = \frac{1}{N} \sum_j u_{jk}^{(t)}$$

6—Go to 3 until convergence

The last equations in the method are obtained while searching for the log-likelihood maximum, thus by calculating the derivative and setting it to zero. Maximize the log-likelihood consists on calculating the following parameter vector $$\Theta^{(t+1)} = \arg\max_{\Theta} \sum_{i=1}^{n} \sum_{k=1}^{m} u_{ik}^{(t)} \log(\pi_k^{(t)} f(x_i; \Theta_k^{(t)})) \text{ with}$$

$$f(x) = \frac{1}{(2\sigma_k^2)^{\frac{n}{2}} \Gamma\left(\frac{n}{2}\right)} x^{\frac{n}{2}-1} e^{-\frac{x}{2\sigma_k^2}},$$

k=1, 2 refer to both Gamma distributions.

This consists in maximizing the following $$M = \sum_{i=1}^{n}\sum_{k=1}^{m} u_{ik} \log\left(\pi_k \frac{1}{(2\sigma_k^2)^{\frac{n}{2}}\Gamma\left(\frac{n}{2}\right)} x_i^{\frac{n}{2}-1} e^{-\frac{x_i}{2\sigma_k^2}}\right).$$

$$\frac{\partial M}{\partial \sigma_k} = \frac{\partial}{\partial \sigma_k}\left(\sum_{i=1}^{n} u_{ik}\left[-n\log\sigma_k - \frac{x_i}{2\sigma_k^2}\right]\right) = 0 \text{ gives}$$

$$\sigma_k^2 = \frac{\sum_{i=1}^{n} u_{ik} x_i}{n\sum_{i=1}^{n} u_{ik}}.$$

The a priori probability $\pi_k$ is updated as the ratio between the number of points belonging to the class $C_k$ and the total amount of measurement points.

According to the inventive embodiment, the signal energy in step 1—is calculated using two consecutive points in the datastream.

Fixing initial conditions in step 2 permits guiding the algorithm to detect the desired classes. An assumption allowing a quick convergence is to use the maximal energy and the median energy as initial variances $\sigma^2$. The baseline class is assigned to the median energy and the useful signal class to the maximal energy. This choice has the advantage that it is adaptive to the current situation. The assumption proved to work well in identifying useful signals, when indeed the two classes were present in the analysed data stream. By taking a datastream that is long enough, as described above, this assumption can be satisfied in most of the cases and therefore prevent that a touch event and thus the useful signal that extents over a long duration will be classified as baseline.

As stated above, the next stage S5 of the inventive method determines properties of the touch event to be able to attribute a certain gesture to a given touch event. To do so one takes advantage of the time delay between corresponding useful signals for different transducers and/or the relative amplitude of the maximum and/or the minimum of the useful signal.

In detail, first of all in S51 clusters of useful signals are detected within the data stream window and among the four transducers 5a to 5c. To do so the procedure segments the data stream window into candidate touch events by searching for common intervals among transducers. In this embodiment, two consecutive independent touch events are supposed to be spaced by at least 300 ms, a time duration which can of course be adapted to varying situations. This means that whenever two intervals, on two different transducers, are spaced by more than 300 ms, they are assigned to two different touch events.

Once the possible touch events have been identified in S51, the time delay between transducers is analysed. This delay determines whether a pattern precedes or succeeds another pattern. For this, a simple technique consists in comparing both the maximal and the minimal values for both patterns. In fact, as the pattern may resemble to a sinusoidal period, there exists a maximum value, corresponding to its positive half-period and a minimal value corresponding to the negative half-period. The problem consists in determining whether the maximum of pattern 1 precedes the maximum of pattern 2 and the minimum of pattern 1 precedes the minimum of pattern 2.

In this case, the transducer 1 is estimated to precede the transducer 2. When maximal and minimal positions do not agree, the zero crossing position is used to estimate the delay among patterns.

According to a variant, to be less perturbed by remaining noise, the delay procedure is performed on a smoothed signal, which is a low passed filtered version of the useful signal.

Figure 4:
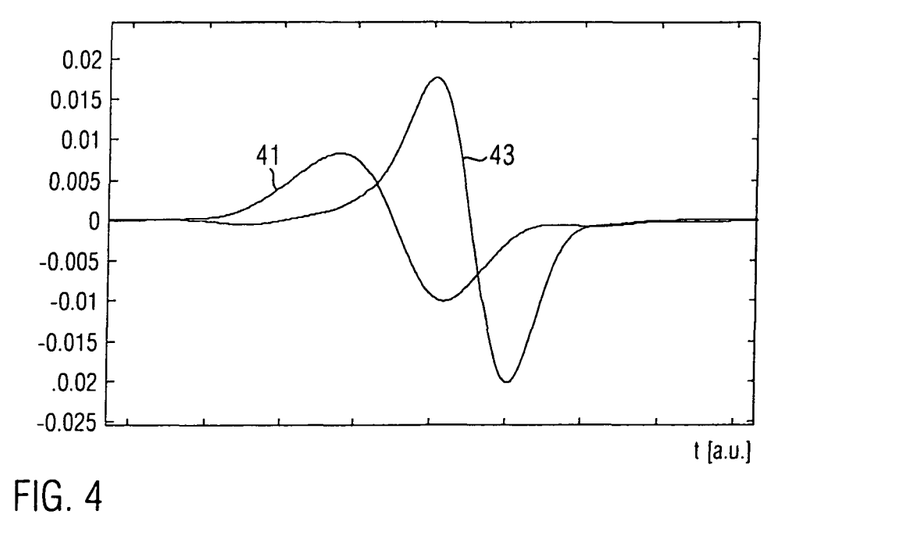
FIG. 4 illustrates two useful signals identified on two different transducers and belonging to the same touch event.

An example is illustrated in FIG. 4, showing the low frequency signal as a function of time observed on two transducers, e.g. 5a with signal 41 and 5b with signal 43. It corresponds to a dragging touch event that moves thus from the transducer 5a to the transducer 5b. The data analyzing unit 9 will thus output a dragging touch event in the direction transducer 5a to transducer 5b. Depending on the velocity, the data analyzing unit 9 will output a flick event or swipe event.

As already mentioned, in order to detect the type of the touch event, it is necessary to sort the transducers in terms of delay but also in terms of amplitude observed.

Figure 5:
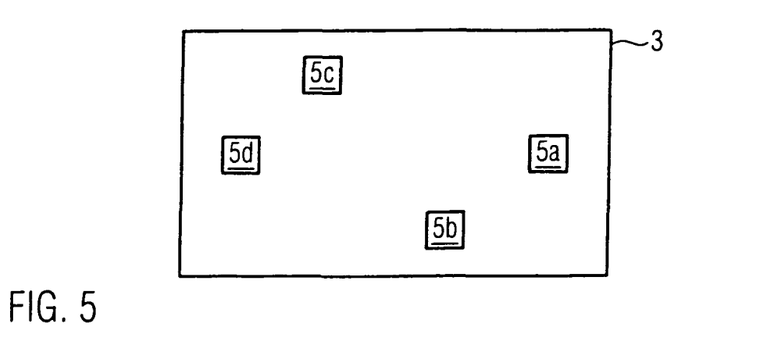
FIG. 5 illustrates an example of an arrangement of four transducers on an interaction surface.

For a transducer configuration as illustrated in FIG. 5, showing the interaction surface 3 and four transducers 5a to 5d, touch gestures will be identified in the following way. For example, a specific drag may give the following pattern sorting a) d) b) c), which means that a pattern was first observed on transducer 5a, then on transducer 5d, then on transducer 5b and finally on transducer 5c. This finding implies that a drag occurred from the right to the left and from the left to the right. The drag passes from transducer 5a to transducer 5b and from transducer 5d to transducer 5c. The analyzing unit 9 will identify it as a dual drag touch event, which is typically classified as a zoom-out gesture. A zoom-out gesture consists in passing from right to left, and from left to right, close to the center of the panel. This means that a zoom-out gesture induces higher signal energies (+) for transducers 5a and 5d than for transducers 5b and 5c (signal energy identified as (−)).

The fusion of amplitude information and transducer sorting is supposed to estimate the gesture type and its direction. More examples are given in the following table:

| Touch event | sorting of signals according to time delay | amplitude of useful signal |
| --- | --- | --- |
| Zoom out | a) then d) then b) then c) | a) +; b) −; c) −; d) + |
| Drag from left to right (in the middle) | d) then c) then b) then a) | a) +; b) −; c) −; d) + |
| Drag from right to left (in the middle) | a) then b) then c) then d) | a) +; b) −; c) −; d) + |
| Zoom in | b) then c) then a) then d) or c) then b) then a) then d) | a) +; b) −; c) −; d) + |
| Drag from top to bottom (in the middle) Impact close to 5d) | c) then a) then b) or c) then d) then a) then b) d) | a) −; b) +; c) +; d) − |
| Drag from right to left (in the upper part of the interaction surface 3) | a) then b) then c) then d) | a) −; b) −; c) +; d) − |
| Rotate right one finger | a) then b) then d) then c) | a) +; b) +; c) +; d) + |
| Rotate right two finger | d) then a) then c) then b) or a) then d) then b) then c) | a) +; b) +; c) +; d) + |

This table is not exhaustive and other rules can be established to classify the touch events. Whenever amplitude and transducer sorting are not coherent, the analyzing unit 9 is configured to classify the touch event as noise. The processing-decision stage may be improved depending on each application of the inventive method. For example, whenever other gestures are desired or other transducer locations are tested, the corresponding decision criteria will be adapted to build a table like illustrated above.

It should be mentioned that the method according to this embodiment can be configured such that as soon as an useful signal has been identified, the useful signal can already be analyzed to be able to determine properties of the corresponding touch event before the complete data stream has been analyzed. Thus, one does not have to await the end of the datastream before a command corresponding to a given gesture will be output. Therefore the method can be run under real time conditions. The same is valid for a touch event that is rather long and extends beyond the data stream window. For instance a slow scrolling down or up during reading of a page shown on a screen, can also be identified by the method.

Figure 6:
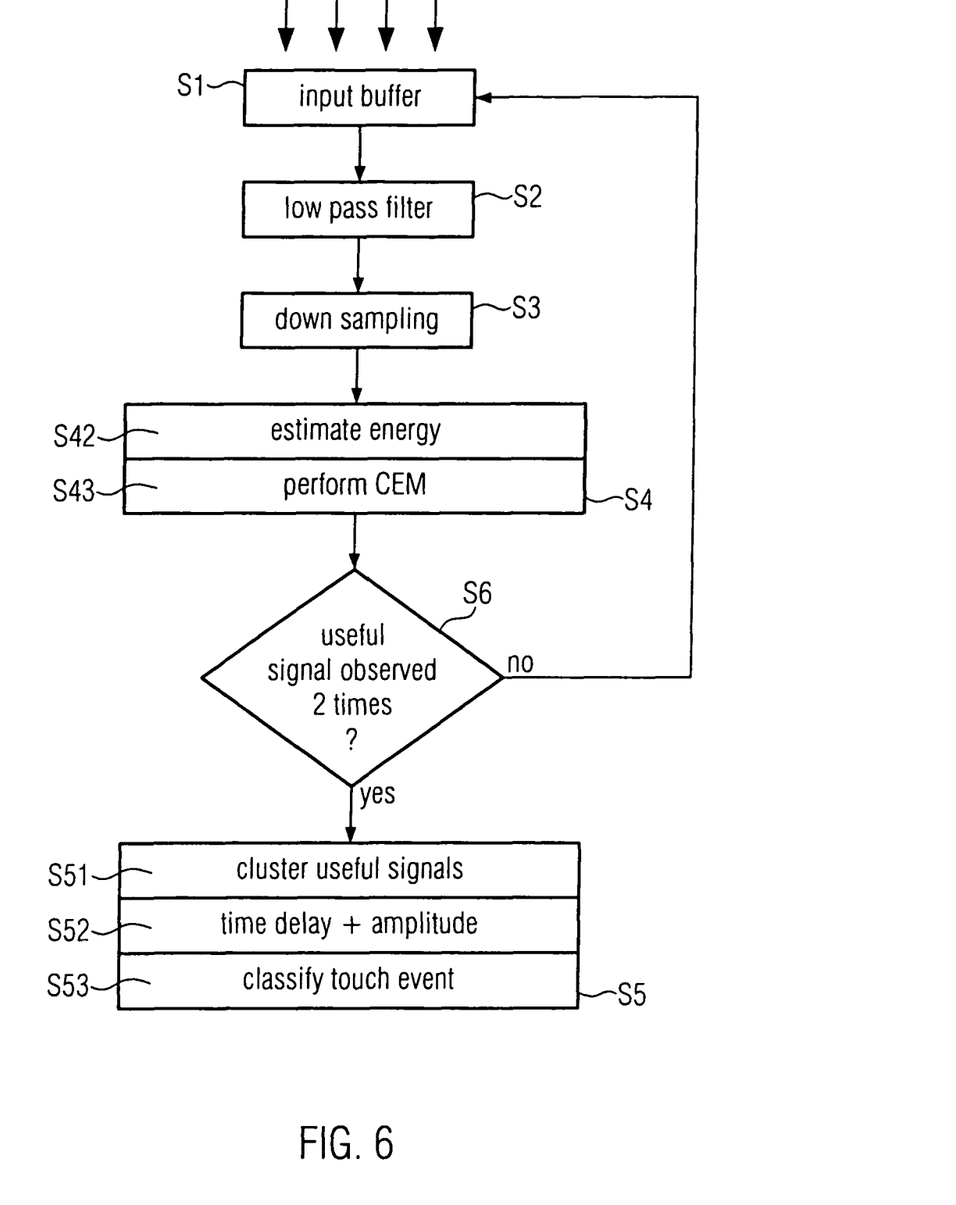
FIG. 6 illustrates a block diagram of a method according to a third embodiment of the invention.

According to a third embodiment of the invention, the method as illustrated in FIG. 3 is amended as illustrated in FIG. 6.

Steps S1 to S4 are carried out like in the first embodiment. Before proceeding to step S5, steps S2 to S4 are again carried out wherein a new data stream taken out of the input buffer (step S1) is analyzed which overlaps with the preceding one. For instance, the new data stream again has 2048 points per transducer and has an overlap of about 94% thus of 1920 points. Of course the overlap can vary depending on the application.

To improve the classification of a touch event, step S5 is only carried out if the same useful signal has been identified in two data streams (step S6). The predetermined amount of times can of course be adapted so that the useful signal needs to present at least three or more times. In the example of 1920 point overlap, the same sequence can be analysed up to 16 times.

This is done in order to prevent remaining noise from causing inappropriate output by the signal analyzing unit 9.

On the other hand, this means that whenever a touch event is processed and detected up to 16 times, only the first two times are enough to decide that it is a gesture that will be classified in the next step S5.

Once the decision has been taken in step S6, it is then, according to a further variant of the third embodiment, possible to take a data steam in the next analyzing run that does no longer overlap with the part of the preceding data stream that comprises the identified useful signal.

This variant has the advantage that the real time processing aspect can be better realized, while at the same time reliability of the gesture detection is kept.

Deciding with only 12.5% of the processing in case the useful signal has been identified in the first two subsequent data streams, may indeed be considered as enough when external noise is acceptable. In case the noise level is higher, the method can be adapted to proceed to step S5 only in case the useful signal has been observed in more datastreams. The adaptation of the threshold can be automatic.

According to a fourth embodiment, the classification-EM algorithm the initial conditions estimation in step 2—is adapted by taken into account information from the previous processing steps of previous datastream. Whenever the Classification-EM detects a baseline, it is obvious that its corresponding variance relates to the noise level, and therefore, it can be used as estimate of the input variance for the baseline class during the next step. Eventually a weighting step can be included such that the new baseline variance is a combination of initial baseline variance and new variance. For instance the baseline variance could be established by baseline variance= (n−1)/n preceding baseline variance plus 1/n new variance. Thus, in particular, at the beginning of the process when the baseline is not yet known a rapid adaptation of the baseline signal properties can be established.

It should be noted that the Classification-EM starts form the initial conditions and estimates during processing new variances that are supposed to reflect the real variances and that all these estimates—initial and final—are obtained automatically, and adapted to each signal. Thus the process can be easily adapted to different applications, different form factors concerning the interaction surface, etc.

The touch sensitive device according to the invention, as well as the inventive methods have the advantage that without having to precisely identify the x, y coordinates of touch points building up a touch event, it is possibly to identify various types of touch gestures. This can be done with a simple process based on statistical analysis of measured raw signals in the low frequency domain. The identified useful signals are then analysed according to rules concerning time delay between signals and amplitudes. No comparison with predetermined databases are necessary to identify acoustic signatures and no complicated data transformations are necessary so that simple electronics can be used which make touch gestures available even for low end applications. The invention is particularly advantageous on rather small interaction surfaces, like e.g. used in handheld devices, as there the number of transducers necessary to identify the gestures can be kept small.

The invention claimed is:

1. Method for determining a touch event provided by a user on an interaction surface of a touch sensitive device comprising the steps of:
   a. sensing a raw signal by a piezoelectric transducer and low-pass filtering the sensed signal,
   b. segmenting the filtered raw signal into a baseline signal and at least one useful signal by applying an expectation maximization algorithm (EM) to the filtered raw signal, wherein the baseline signal corresponds to noise and the at least one useful signal corresponds to a touch event, and
   c. analyzing the at least one useful signal to determine properties of the touch event.

2. Method according to claim 1, wherein step b) comprises applying a statistical model to segment the filtered raw signal.

3. Method according to claim 1, wherein step b) is carried out in the time domain.

4. Method according to claim 1, wherein the filter has a maximal passing frequency of 100 Hz, in particular 50 Hz, more in particular 30 Hz.

5. Method according to claim 1, wherein step b) further comprises a classification expectation maximization algorithm (CEM).

6. Method according to claim 2, wherein to apply the statistical model, it is assumed that both baseline and useful signals each have a Gaussian distribution and their signal energies follow Gamma distributions.

7. Method according to claim 6, wherein at an initialization step of the expectation maximization algorithm, the variances of the Gaussian distribution of the baseline signal and the Gaussian distribution of the useful signal are based on signal energy, wherein the useful signal class relates to maximal energy, and wherein the baseline class relates to the median energy.

8. Method according to claim 1, wherein during segmenting in step b) a stream of a predetermined duration of the sensed signal is analyzed.

9. Method according to claim 8, wherein subsequent streams overlap.

10. Method according to claim 9, wherein when during step b) the same useful signal has been identified in a predetermined amount of streams, and the following stream does not overlap with the part up to the end of the useful signal of the precedent stream.

11. Method according to claim 8, wherein the stream has a length of at most two seconds.

12. Method according to claim 1, wherein step c) comprises attributing a touch event as soon a useful signal has been transmitted to step c.

13. Method according to claim 1, wherein step a) comprises sensing raw signals by more than one transducer and carrying out step b) for each one of the sensed signals.

14. Method according to claim 13, wherein step c) comprises identifying at least one of various types of gestures, the various types of gestures including one or more of drag, direction of drag, rotate, direction of rotation, zoom-in, and zoom-out, based on at least one of the time delay between one or more predetermined characteristics of the useful touch signals identified during step b) and their relative values for the more than one sensed raw signals.

15. Method according to claim 14, wherein the one or more predetermined characteristics relate to the position of the maximal, minimal or signal average crossing of the useful signal.

16. Method according to claim 14, wherein the type of gesture is only determined based on the time delay and the positions of the transducer with respect to the interaction surface.

17. Method according to claim 1, further comprising a step of smoothing the useful signal prior to step c).

18. Non-transitory computer program product comprising one or more computer readable media having computer executable instructions for performing the method of claim 1.

19. Touch sensitive device comprising an interaction surface for receiving touch events provided by a user and at least one piezoelectric transducer for sensing a signal, a low-pass filter unit, and a signal analyzing unit configured to identify the touch event according to the method to of claim 1.

20. Mobile device comprising a touch sensitive device according to claim 19.

21. Mobile device according to claim 20, wherein at least one of a front or and a backside of the mobile device comprises a touch sensitive device comprising an interaction surface for receiving touch events provided by a user and at least one piezoelectric transducer for sensing a signal, a low-pass filter unit and, a signal analyzing unit configured to identify the touch event, and wherein a display device is provided on the front side.

* * * * *

UNITED STATES PATENT AND TRADEMARK OFFICE
CERTIFICATE OF CORRECTION

PATENT NO. : 8,619,063 B2  
APPLICATION NO. : 13/808058  
DATED : December 31, 2013  
INVENTOR(S) : Chaine et al.

Page 1 of 1

It is certified that error appears in the above-identified patent and that said Letters Patent is hereby corrected as shown below:

In the Claims:

Column 12,  
Lines 45 and 46, cancel ", in particular 50 Hz, more in particular 30 Hz".

Column 14,  
Line 13, "the method to of claim 1." should read --the method of claim 1.--;  
Line 17, "a front or and a backside" should read --a front and a backside--.

Signed and Sealed this  
Thirteenth Day of May, 2014

Michelle K. Lee  
*Deputy Director of the United States Patent and Trademark Office*